P. Crosby.
Saw.
No 27,779
Patented Apr. 10, 1860.
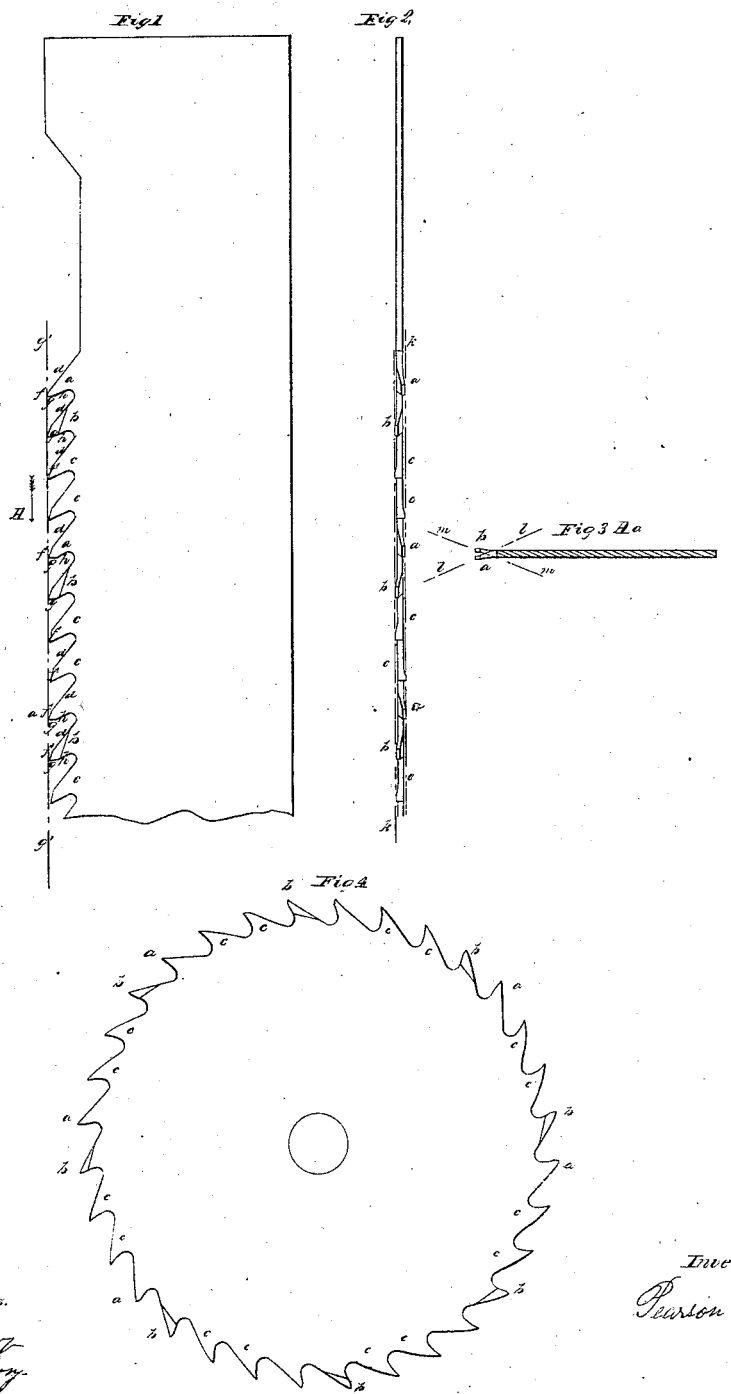
Witnesses.
Inventor.
Pearson Crosby

UNITED STATES PATENT OFFICE.

PEARSON CROSBY, OF NEW YORK, N. Y.

SAW.

Specification of Letters Patent No. 27,779, dated April 10, 1860.

*To all whom it may concern:*

Be it known that I, PEARSON CROSBY, of the city, county, and State of New York, have invented a new and useful Improvement in Saws for Cutting Lumber; and I do hereby declare that the following is a full, clear, and exact description thereof, reference being had to the accompanying drawings, making part of this specification, in which—

Figure 1, represents a face view of a straight mill saw; Fig. 2, an edge view; Fig. 3, a horizontal section taken at the line A, a, of Fig. 1; and Fig. 4, is a face view of a circular saw.

The same letters indicate like parts in all the figures.

The object of my invention, which relates to the form and set of the teeth of all kinds of saws for cutting timber, is to enable the saw to cut with more ease, and thus reduce the power required for effecting the cut, to increase the cutting capacity of the saw, to leave the surface of the lumber in better condition than when cut by saws as heretofore made, and to render the saw more durable.

It has long been known that the efficiency of a saw depends upon the form and set of the teeth, the mode of operation in effecting the cut determining the amount of power required to drive it, the amount of lumber which it will cut in a given time, the condition of the surface of the lumber produced, the durability of the saw, and the amount of timber wasted by the size of the saw kerf. If the teeth be so shaped as simply to form the kerf by a tearing action of the teeth the amount of power required to drive the saw will be very great, and the surface of the lumber produced will be very rough, and the teeth of the saw will wear out very rapidly. If the teeth be so formed as to cut in the manner of a chisel, and that tendency be too great, the teeth will have a tendency to run into the wood faster than is due to the rake of the saw and the feeding or advancing motion of the timber, which will strain the saw and waste power, and the surface of the lumber will still be very rough, and a considerable amount of set will be required, and in consequence the slightest irregularity in the set will give to the saw a tendency to run out of the required line of cut, this latter tendency requiring the saw to be made very thick to resist this tendency and in consequence the increased thickness will require an increase of driving power, and result in an increase waste of timber. To overcome these serious difficulties in addition to making the front cutting edge of the teeth chisel shaped, some of the teeth, at given distances apart, have been made with a chisel edge alternately on opposite sides, and although this has a tendency to leave the surface of the lumber more smooth and even, yet in view of the rapid wear of these cutting edges, and the increased tendency which they have to run out of the true line of the intended cut, and of the consequent necessity of making the saw very thick, this mode has never gone into general practical use. By my improvement I avoid all the above difficulties and defects.

In the accompanying drawings ($a$, $b$) represent what I term the slitting or cutting-in teeth, and ($c$) the cutting away teeth. I prefer to make them in alternate sections, two cutting-in teeth, and then two cutting-away teeth, and then again two cutting-in teeth and so on to the end or entirely around the circle, if the saw should be circular, although the number of teeth in each section may be varied. The form of all the teeth when view from the side of the saw is generally the same, the upper edge ($d$) being of the usual bevel, and in one line until within about one eight of an inch of the point, the rest being at a different angle ($f$) and forming an angle with the line ($g'$) of the cutting edge of the saw of about 80 degrees. This angle at the tip of the teeth is to prevent the cutting edge from cutting into the wood faster than is due to the rake or feed; and this angle which I term the angle of "cut" should be increased or decreased as it is desired that the saw should make its cut more or less rank, as it is technically termed; the angle of the upper edge above the angle of the cut, and which may be termed the angle of clearance, should always be sufficient to make room to contain the sawdust until the tooth passes through the log to discharge.

The under edge ($h$) of the teeth I prefer to make at the angle of about 70 degrees with the line of the cutting edge to form with the upper edge ($d$) sufficient space for clearance and this angle extends to the cutting edge for the cutting-away teeth, but for the slitting or cutting-in teeth I prefer to change the angle near the point to make the cut more smooth. For a short distance from the cutting edge of the cutting-in teeth back the lower edge of each tooth is formed with an angle represented by the line $(g)$ of about 85 degrees with the line $(g')$ of the cutting edge of the saw; that is to say, a little less than a right angle. By this means while I give an abundance of clearance or room for the shavings (usually termed sawdust) I avoid giving so much of the chisel cut to the cutting edge as would tend to make a rough cut, but this is a mere preference.

The cutting-in teeth are made a little longer than the cutting-away teeth to separate from the sides of the kerf the wood which is to be cut away by the other and shorter teeth. The teeth are all set, as usual, alternately to the right and left, and after being so bent, the tips of the projecting part of all the teeth on each side, is filed off to a plane parallel with the face of the saw, as represented by the lines $(k, k)$. This prevents all tendency of the saw to run out of the intended line of cut. In addition to this the teeth $(a)$ are beveled on one side to a plane represented by the line $(l)$ and the teeth $(b)$ on the opposite side represented by the line $(m)$. These bevels run back about half the depth of the teeth, and reduce the thickness of these teeth at the cutting edge where they project beyond the other teeth to about one fourth of the thickness of the saw plate. These teeth which are very narrow at the cutting edge serve the purpose, by a species of slitting action, of forming the surface of the lumber to be produced by separating therefrom the mass of wood which is afterward cut away by the teeth $(c)$ from the end of the kerf, and which if not thus separated by the narrow teeth $(a, b)$ (which I term slitting or cutting in teeth) would be torn off violently from the sides of the kerf leaving the surface rough, and which at the same time by the varying texture of the wood would tend to draw the saw out of the intended line of travel. In this way I attain all the advantages heretofore contemplated by making the saw teeth with sharp shaving or planing edges at the sides, and avoid all the defects due to such sharp edges. I am thus enabled to use saws of less thickness than on any other known plan, thereby reducing the amount of driving power required, and the amount of waste, while the tendency to wear is reduced, and the quality of the surfaces produced improved.

What I claim as new and desire to secure by Letters Patent is—

Making saws with the teeth of the form substantially as described, that is to say, with the two angles on the upper edge and with the sides of the teeth after being set brought to a plane on each side parallel with the face of the saw substantially as described, but this I only claim in combination with the slitting teeth made of greater length than the cutting away teeth, and beveled laterally and alternately on opposite sides, substantially as and for the purpose specified.

PEARSON CROSBY.

Witnesses:
 Wm. H. Bishop,
 Peter De Lacy.